United States Patent

[11] 3,550,948

| [72] | Inventor | McKinley W. Thompson, Jr. |
| | | 18991 Mendota, Detroit, Mich. 48221 |
| [21] | Appl. No. | 748,479 |
| [22] | Filed | July 29, 1968 |
| [45] | Patented | Dec. 29, 1970 |

[54] AUTOMOBILE BODY CONSTRUCTION
10 Claims, 6 Drawing Figs.

[52] U.S. Cl. ................................................ 296/28,
296/31, 296/137
[51] Int. Cl. ............................................... B62d 31/00
[50] Field of Search .......................................... 296/28, 31,
31P, 137, 146; 156/(Inquired); 264/(Inquired)

[56] References Cited
UNITED STATES PATENTS
| 3,331,627 | 7/1967 | Schroder et al. ............... | 296/31(P) |
| 3,409,323 | 11/1968 | Schweser ...................... | 296/28 |
| 3,415,568 | 12/1968 | Gugelot ........................ | 296/31 |

FOREIGN PATENTS
| 910,251 | 11/1962 | Great Britain ................ | 296/31(P) |

Primary Examiner—Benjamin Hersh
Assistant Examiner—John A. Pekar
Attorney—Settle, Batchelder and Oltman ABSTRACT: A unitary body construction consisting of two shell sections formed of a corrosion resisting material which defines a substantially sealed space housing a metal tubular frame. The structure is bonded and sealed so that the metal parts are completely covered while the shell sections define the passenger compartment, running gear and power plant compartment, and cargo compartment for the vehicle. The unitary body defines the vehicle body as well as the chassis frame and may support sliding canopy sections which enclose the passenger compartment.

PATENTED DEC 29 1970

INVENTOR.
MCKINLEY W. THOMPSON, JR.
BY
SETTLE, BATCHELDER & OLTMAN.
ATT'YS.

INVENTOR.
MC KINLEY W. THOMPSON, JR.
BY
SETTLE, BATCHELDER & OLTMAN.
ATT'YS.

AUTOMOBILE BODY CONSTRUCTION

BACKGROUND OF THE INVENTION

The present invention relates generally to transport vehicles and more particularly to an improved chassis frame and body construction for transport vehicles.

The fabrication of automobile bodies from corrosion resistant materials has commanded a great deal of attention in recent years. Of course, the advantages of a corrosion resistant material for an automobile body are obvious since it eliminates all problems of rust, etc. Thus, there have evolved many different types of automobile bodies and many techniques for fabricating the same and securing them to automobile chassis.

One of the problems in fabricating plastic car bodies results from the limitation of the size and shape of a mold which can be utilized to fabricate different sections of the body. Thus, in most present day commercial techniques for fabricating automobile bodies, it has been customary to provide various different mold sections for areas such as, side panels, rear ends, tops, fenders, hoods etc. Of course, such a technique is not only time consuming but is also very costly in the manufacture of the various molds required.

Furthermore, in all vehicles of a plastic construction presently known to applicant, it is still necessary to attach a chassis frame to the nonmetallic body to support the running gear, transmission and power plant for the vehicle. Thus, in present day practices of plastic body construction, the advantages of the corrosion resistant material are immediately lost when the automobile body is assembled by utilizing metallic chassis frame parts.

Thus, the obvious result is that most commercial production vehicles presently on the market still utilize the highly objectionable metal body which requires many manufacturing steps as well as an innumerable number of assembly steps in the production of the automobile body and chassis frame.

SUMMARY OF THE INVENTION

The present invention alleviates all of the above-mentioned shortcomings by providing a unitary body structure which is formed of three sections and which defines the entire vehicle body as well as the chassis frame. All of the metallic parts of the body and chassis frame are completely covered by a corrosion resistant material to eliminate all problems of rust, etc. in the resultant structure.

The primary object of the present invention is to provide an improved body construction which defines the chassis frame and body shell with all of the exposed parts of the body being formed of a corrosion resistant material.

Another object is to provide an improved combined chassis frame and vehicle body which includes corrosion resistant shell sections internally reinforced by metallic frame sections.

A further object of the invention is to provide an improved body construction consisting of a reinforced body section which defines the passenger space, power plant space as well as the cargo space for the vehicle.

Other objects of this invention will appear in the following description and appended claims reference being had to the accompanying drawings forming a part of this specification wherein like reference characters designate corresponding parts in the several views.

FIG. 1 of the drawings shows a side elevation view of an automobile body constructed in accordance with the present invention with the canopy secured thereto;

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 4:
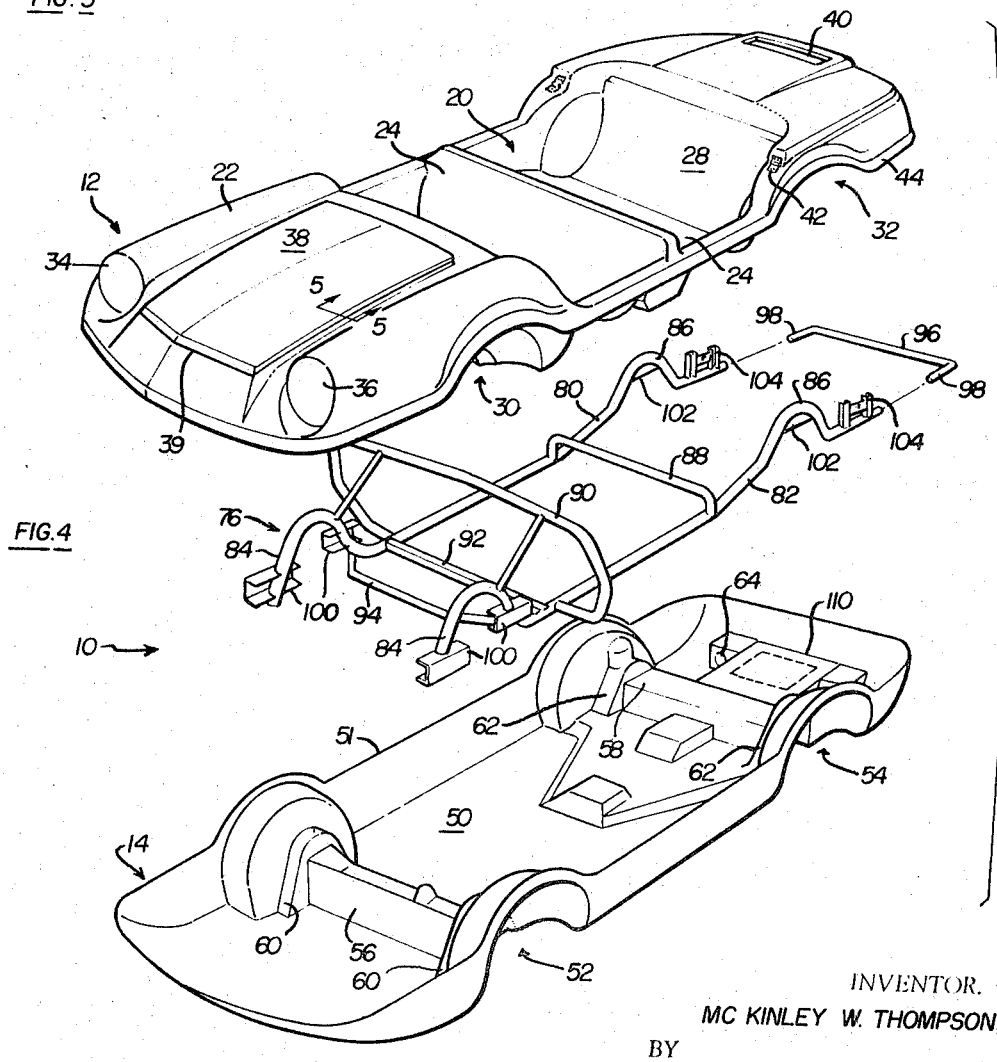
FIG. 4 is an exploded view of the automobile body shown in FIG. 1, prior to assembly.

With the particular reference to the exploded view of FIG. 4, it will be noted that the body structure and chassis frame 10 includes an upper section 12, a lower section 14 and an intermediate tubular frame section 16. The upper and lower or first and second sections are formed of a corrosion resistant plastic material preferably a trademarked product known as Royalex sold by United States Rubber Company. Royalex is a laminated thermoplastic resin material consisting of a core of unicellular foam having opposed surfaces covered with sheets of thermoplastic resin to produce a rigid structure. Likewise, a Royalite material also a trademarked product of United States Rubber Company may be utilized. The details and advantages of this particular structure will become more apparent hereinafter.

The upper body section 12 has a passenger space 20 defined intermediate the opposite ends thereof which is defined by an upwardly opening recess molded into the unitary sheet 22 defining the upper section of the body. The passenger space or compartment includes transversely extending integral sections 24 defining the seats for the passengers. Of course, it is readily apparent that the transversely extending areas 24 greatly rigidify the entire body structure.

The forward end of the passenger space includes an inclined wall section 26 defining the partial area of what is conventionally termed the fire wall in the vehicle having the engine at the forward end thereof. Likewise, the opposite end of the compartment space likewise has an inclined wall 28 to define a completely enclosed compartment space.

Downwardly directed recesses or portions 30 and 32 are located on the opposite ends of the passenger compartment 20 and define spaces for the reception of the power and ground support mechanisms for the automobile, which will become apparent hereinafter.

Figure 5:
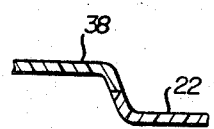
FIG. 5 is an enlarged fragmentary sectional view of the upper shell section.

The body defining the forward downwardly opening recess or portion 30 has a pair of openings 34 and 36 which will accommodate the headlights for the automobile. Also, the upper portion 38 of the forward section of the upper shell 12 is preferably cut along a continuous line 39 to define an access opening into the forward recess or compartment, for a purpose which will become apparent hereinafter. Of course, the section 38 will be secured by hinges adjacent the rear edge thereof and suitable latch means may be provided adjacent the side edges or the forward edges (not shown). It will be noted in FIG. 5 that the cut line 39 for defining the access opening is disposed along an area of the body section which extends substantially perpendicular to the remainder of the body so as to provide reinforcement for the remaining body section as well as for the removable cover 38. This results from the inclined walls located adjacent the opening defined by the cut line 39.

Likewise, the rear section of the upper shell half defining the downwardly directed recess or cavity 32 has a removable cover section 40 which is hinged at 42 at the forward end thereof to the main body panel, for a purpose which will become apparent hereinafter. The forward and rearward recesses or portions 30 and 32 are adapted to respectively receive the running gear or ground supporting wheels and ancillary structure as well as the power plant for the vehicle. In the preferred embodiment, the power plant is disposed in the portion 32 and is connected to the rear wheels so that it is unnecessary for providing any connections between the forward and rearward running gear areas.

The entire peripheral edge of the upper shell section 12 has a continuous downwardly directed lip 44, for a purpose which will become apparent hereinafter.

The lower or mating section 14 is likewise formed of a Royalex material and is defined by a continuous uninterrupted sheet 50 having an upwardly directed edge 51. The sheet is molded or deformed to a configuration having a forward downwardly directed opening or recess 52 and a rearward downwardly opening recess 54 respectively defining transversely extending openings for reception of the running gear and the vehicle power plant.

Of course, the protrusions 56 and 58 defining the downwardly opening recesses 52 and 54 again rigidify the entire structure while at the same time defining an important element for the combination. It should be noted at this point that spaced saddles 60 and 62 are defined on opposite ends of the transversely extending members 56 and 58. The area intermediate the protrusions is substantially flat and defines a continuous surface along the lower area thereof.

The intermediate section or metallic frame 16 is preferably formed of a tubular construction having two transversely spaced longitudinally extending tubes 80 and 82. Each tube has an arched portion 84 adjacent the forward end thereof and a second arched portion 86 adjacent the rear end thereof. The two tubular side members 80 and 82 are interconnected by transversely extending fixed tubular members 88, 90, 92 and 94 and a separable rear transversely extending tubular member 96 which has forwardly directed portions 98 adapted to be received into the rearwardly extending openings of the respective side members 80 and 82, for a purpose which will become apparent hereinafter. Of course, the transversely extending tubular members 90, 92 and 94 are all located in the area just forwardly of the passenger space of the vehicle and define a rigid structure adjacent the forward end of the passenger compartment.

In the illustrated embodiment, the forward arched portions 84 of the side members 80 and 82 each have a pair of longitudinally extending brackets 100 fixedly secured to the lower outer edges of the respective legs which define the arched portions 84. These brackets are utilized in subsequently assembling the forward running gear to the completely assembled automobile body. Thus, the running gear is fixedly secured to the metallic rigid frame structure 16. Likewise, the arched portions 86 have longitudinally extending shear plates 102 fixedly secured thereto as by welding adjacent the upper ends thereof and again are utilized for fixedly securing the rear wheels or running gear to the tubular frame section. Each of the longitudinally extending members 80 and 82 likewise has a bracket 104 fixedly secured to the rear end thereof for attachment of the automobile engine thereto.

The method of assembling and interconnecting the three sections 12, 14 and 16 can readily be appreciated from the above description. The first step in assembling the three sections is the removal of the transversely extending cross brace 96 from the remainder of the tubular frame structure 16. This leaves two rearwardly extending tubular portions defined by the rear ends of the tubular members 80 and 82 at the rear end of the frame. The two ends of the tubular members are respectively disposed in the openings 64 and forced rearwardly a sufficient distance so that the arched portions 84 and 86 of the respective side members 80 and 82 are respectively received on the saddles 60 and 62 defined on the lower shell half or first section. Of course, longitudinally spaced extending slits must be formed at the upper end of the respective saddles 62 for the reception of the shear plates 102. Also, the area 110 defining a portion of the rear downwardly open recess 54 is cut out from the remainder of the body for the reception of the automobile power plant therethrough as will become apparent hereinafter.

The next step in the assembly of the entire unit is to provide a bonding material along the entire contact areas of the tubular frame which is in contact with the lower section 14 as well as the areas which may be in contact with the upper section 12. Of course, the greatest areas of support for the tubular frame are the saddles 60 and 62 and these areas would necessarily receive bonding material just prior to assembly of the tubular frame in the lower shell section.

The upper peripheral edge 51 of the lower section as well as the downwardly directed lip 44 of the upper section are also coated with a bonding material and the two shell halves are thereafter assembled so that the downwardly directed lip 44 of the upper section produces a mating peripheral edge which is in continuous contact with the outer surface of the upwardly directed peripheral edges 51 of the lower section. This mating of the two edges is clearly shown in FIG. 2.

It can readily be appreciated that the manner of assembling the three sections produces a substantially continuous uninterrupted surface of corrosive resistant plastic material which is exposed to the atmosphere. Substantially all of the metallic tubular parts are completely covered and sealed by the corrosion resistant plastic material. Therefore, the only areas of metallic material which are exposed would be the interconnection between the spaced wheels and of course the steering mechanism for the front wheels as well as parts of the automobile engine adjacent the rear end thereof.

In fact the particular manner of assembling the integral body structure results in an amphibious structure which is capable of being supported on water. Thus, if desired, a suitable amphibious propulsion system such as an outboard motor, may be attached to the cross member 96 and the unitary body may be utilized as a watercraft.

Figure 1:
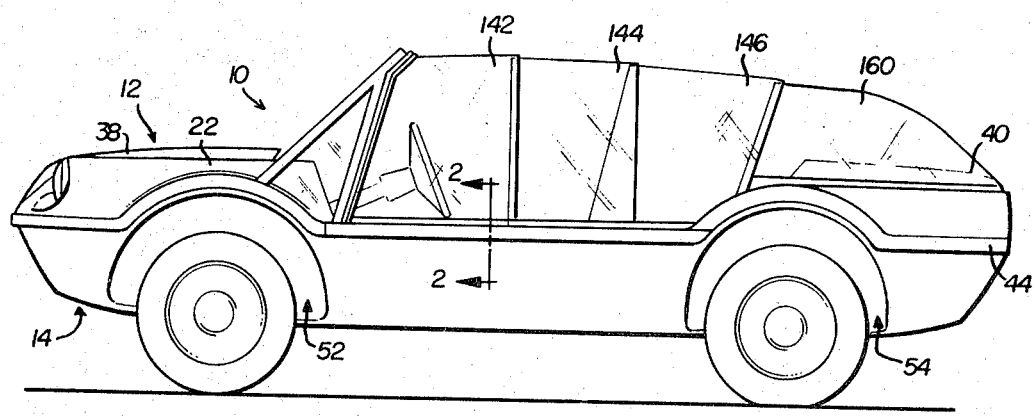
Figure 2:
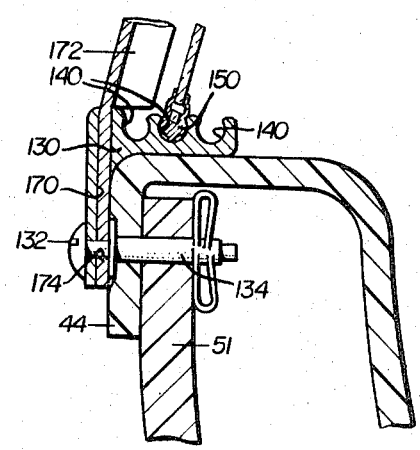
FIG. 2 is an enlarged fragmentary vertical sectional view taken generally along lines 2—2 of FIG. 1.

According to a further aspect of the present invention, a simple and improved type of canopy cover is provided for the unitary body structure described hereinabove. With particular reference to FIGS. 1 and 2, it will be noted that the edges of the longitudinally extending upper members adjacent the passenger space of the vehicle each have an angle member 130, preferably of extruded material secured thereto. The securement of this extruded angular member 130 may be accomplished by bonding the member to the peripheral surface of the upper section and/or utilization of bolts 132 having expansion type sleeves 134 associated therewith. Thus, just prior to attachment of the angle member 130, the sleeves 134 may be inserted in openings extending through the peripheral edges of the respective sections and deform to the configuration shown in FIG. 2. This not only provides the rigid fixed support for the member 130 but also provides a further interconnection between the mating edges of the two shell sections. Of course, after the sleeve has been attached to the unitary body, the bolt 132 may be inserted through openings therein for attachment of various other components thereto.

The upper edge of the track member 130 has a plurality of spherical elongated recesses or openings 140 formed therein. Of course, two such members are used, located on opposite sides of the passenger compartment while only one is shown in FIG. 2. As shown in FIG. 1, three canopy sections of solar control transparent acrylic plastic 142, 144 and 146 have free lower edges slidably supported in the respective recesses of the respective track members or means 130.

Thus, each of the canopy sections is dome shaped and has nonmetallic runner 150 of low friction material such as Teflon fixedly secured to the lower edges thereof and slidably received in one of the recesses or openings defined in the track member 130. It is readily apparent that the canopy sections can be moved relative to each other for ingress and egress into the passenger compartment, as well as for providing proper ventilation for the compartment.

If the canopy sections are utilized on the automobile body preferably a further domed section 160, also of solar control transparent acrylic plastic or molded from a corrosive resistant plastic material is fixedly secured to the rear end of the main body to further increase the space adjacent the rear end thereof and also seal the rear opening of the rear canopy section 146. This domed section is mounted to the removable cover 40 and may be an additional element to define additional cargo space above the engine compartment.

Of course, a windshield is also fixedly secured to the forward section of the unitary body construction. For this purpose, the side members adjacent the forward end of the passenger compartment have downwardly extending openings 170 extending through the downwardly projecting leg of the member 130. The lower end of a substantially U-shaped frame element 172 is slidably received in the opening 170 and is fixedly secured thereto by one of the screws 132 extending through openings 174 and threadedly received on the nuts formed on the end of the sleeves 134.

Figure 6:
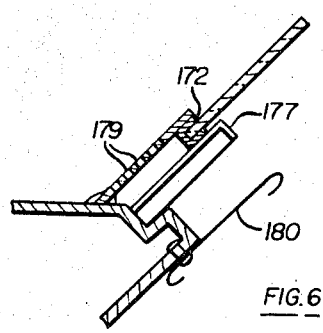
FIG. 6 is an enlarged fragmentary sectional view of a part of the windshield area of the automobile.
Figure 3:
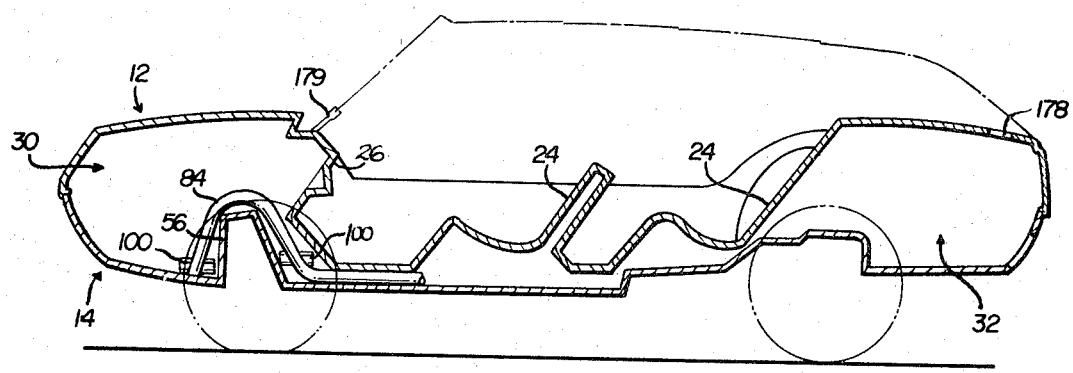
FIG. 3 is a fragmentary vertical longitudinal section of the automobile body shown in FIG. 1.

According to a further aspect of the present invention, means are provided for producing circulation through the entire passenger space as well as the power plant space from a point adjacent the forward end of the vehicle (see FIG. 6). Thus, the lower edge of the windshield is spaced slightly above the upper surface of the upper shell half section to provide a transversely extending opening 176 extending substantially across the entire width of the area which is conventionally termed the dashboard of the vehicle. Within this opening a perforated protective screen 179 is fastened to lower windshield frame 172 and sealed to the upper surface of the upper shell and a suitable type of filtering device 177 is secured so that air entering the passenger compartment will be suitably filtered of any contaminant, such as dust and dirt and deflected upward by suitable baffle 180. The air passes through the passenger compartment and thereafter is received in the space between the section 160 and the upper surface of the main body section 40. Suitable openings 178 are provided adjacent the rear end of the upper section to place the space adjacent the section 160 in open communication with the engine compartment of the vehicle.

Thus, with a conventional type of air or water cooled engine, the air necessary for proper cooling of the engine is received from the forward end of the passenger space of the vehicle, passes through the passenger space of the vehicle to provide suitable ventilation when all of the canopies are closed and thereafter exits through the openings into the engine compartment of the vehicle to provide the necessary air for cooling the engine. After the air passes through the engine compartment it is exhausted below the automobile body into the atmosphere.

This particular feature is of extreme importance when the vehicle is being utilized as transportation in highly contaminated areas such as desert where considerable dust and other undesirable contaminants are always present. This is particularly true on a rear engine vehicle where the front wheels as well as the rear wheels will disturb the minutely particled ground and create a large amount of dust which then is sucked into the air intake for the engine and of course is highly undesirable. In the present arrangement explained hereinabove, all the air is withdrawn from the atmosphere at a point substantially above and adjacent the forward wheels of the vehicle prior to any disturbance of the ground so that the air is substantially free of dust and greatly reduces the amount of contamination of the engine cooling system.

From the above description it can readily be appreciated that the present invention provides a simple and efficient manner of producing a unitary structure which defines the vehicle body of a transport vehicle as well as the chassis frame thereof with all of the elements normally necessary for the chassis frame being completely covered and sealed to prevent any corrosion of the metallic elements which are of course necessary to produce a rigid body structure. The particular corrosive resistant plastic material which is preferred in the construction of the present unitary structure has sufficient rigidity to withstand extreme shock forces and the rigidity of the plastic structure combined with the metallic frame structure provides a highly desirable body for a vehicle.

The utilization of a Royalex or Royalite material greatly aids in the formation of a simple and inexpensive body section which may be formed merely by producing a mold, heating the Royalex material to a plastic state, extending the Royalex material over the mold and attaching a vacuum source to the space between the Royalex material and the open areas of the mold which will thus draw the Royalex material to the configuration of the mold. Within a very short period of time, such as for example 15 minutes, the plastic material has cooled sufficiently to be reduced to a solid state and upon being completely cooled has great inherent rigidity sufficient to withstand any extreme forces even in conditions of a collision. Of course, the specific manner of constructing and assembling the unitary body structure results in additional rigidity of the plastic body by the metallic tubular frame elements bonded to the inner peripheral surface of the respective sections.

I claim:

1. A combined chassis frame and vehicle body comprising an elongated single first piece of plastic material defining a dished upwardly opening body component molded to define a downwardly directed recess adjacent each end thereof on one surface thereof and adapted to receive the running gear and power source for the vehicle and an elongated single second piece of plastic material defining a dished downwardly opening body component molded to define an upwardly opening depressed recess providing a seating area intermediate said downwardly directed recesses of said first piece and adapted to support the occupants of the vehicle, and an elongated tubular metallic frame fixedly secured to the first piece on the upper surface thereof, said metallic frame comprising transversely spaced longitudinal members extending adjacent opposite sides of said first pieces with transverse metallic members interconnecting said longitudinal members and bracket means on said metallic frame adapted to support said running gear and said power source, and means adhesively securing the peripheral edges said first and second pieces of plastic to one another with the frame interposed therebetween, said second piece being secured to said frame only where there is contact therebetween.

2. The combination as defined in claim 1, further including means defining a track on each of the edges of said first piece adjacent said upwardly directed recess and a cover member slidably supported on said tracks for enclosing said upwardly directed recess.

3. The combination as defined in claim 2, in which each of said first and second pieces consists of laminated thermoplastic resin material with said frame bonded to said pieces whereby said frame and pieces of plastic material define a unitary structure.

4. The combination as defined in claim 1, further including a second piece of elongated plastic material having downwardly opening recesses adapted to receive said running gear and said power source, means on the peripheral edges of each of said pieces for interconnecting said pieces and substantially sealing said tubular frame between said pieces.

5. The combination as defined in claim 4, including the further improvement of means defining at least two longitudinally extending tracks on each side of said first piece adjacent said upwardly opening recess and at least two canopy sections respectively having edges received in one of said tracks on each side of said recess whereby said canopy sections may be moved relative to each other to open and close said upwardly directed recess.

6. A method of forming a chassis frame and vehicle body comprising the steps of thermoforming a first shell section of laminated plastic material having a perimetric edge surrounding contoured areas defining a passenger space intermediate the ends on one surface thereof and recesses on the opposed surface of said shell half at opposite ends of said passenger space, thermoforming a second shell section of laminated plastic material having a perimetric edge surrounding a recessed contoured area defining an integral seat, forming a metallic tubular frame section having spaced side member, juxtaposing said shells on opposite sides of said tubular frame section, with the shell edges telescoped relative to one another, attaching said frame section to one of said shell sections, and then bonding the perimetric edges of said shell halves to each other to produce a substantially unitary structure defining the vehicle body and chassis frame with said metallic frame enclosed by said shell sections.

7. A unitary body structure defining combined chassis frame and vehicle body for a transport vehicle comprising first and second cooperating corrosion-resistent laminated nonmetallic bodyddefining sections having mating vertical peripheral edges extending completely around the perimeter of each section, a metallic tubular frame structure interposed between said sections, adhesive means for securing and sealing said mating peripheral edges to each other in overlapped relation, means for securing said metallic frame to each section, means defining recesses on opposite ends of said sections for receiving the ground supporting members and power plant of said vehicle and means extending through one of said sections for securing said ground supporting members and power plant to said metallic frame, whereby said unitary body structure defines the connection between said ground supporting members received in the respective recesses.

8. A unitary body structure as defined in claim 7, wherein said first and second sections define upper and lower surfaces of said vehicle body including the further improvement of means integral with said upper section defining a passenger compartment intermediate said recesses, said last means including elements defining contoured seats in said compartment.

9. A unitary body structure as defined in claim 8 including the further improvement of track means on opposite sides of said compartment and at least two canopy sections slidably supported on said track means for enclosing said compartment.

10. A unitary body structure as defined in claim 7 including the further improvement of ventilation means comprising first means defining an opening adjacent the forward end of said passenger compartment, filtering means in said opening and second means defining an opening communicating with said passenger space and said recess supporting the power plant whereby cooling air is received adjacent the forward end of said passenger space to ventilate said passenger space and passes through said recess supporting the power plant to cool the power plant.